United States Patent
Ohmert

(10) Patent No.: US 11,373,459 B2
(45) Date of Patent: Jun. 28, 2022

(54) PROGRAM AND VEHICLE INTERACTION

(71) Applicant: INRIX INC., Kirkland, WA (US)

(72) Inventor: Steven Timothy Ohmert, Vashon, WA (US)

(73) Assignee: RUNWAY GROWTH CREDIT FUND INC., Chicago, IL (US)

( * ) Notice: Subject to any disclaimer, the term of this patent is extended or adjusted under 35 U.S.C. 154(b) by 0 days.

(21) Appl. No.: 15/351,681

(22) Filed: Nov. 15, 2016

(65) Prior Publication Data

US 2018/0137692 A1    May 17, 2018

(51) Int. Cl.
| G07C 5/00 | (2006.01) |
| G06F 9/54 | (2006.01) |
| G06F 8/65 | (2018.01) |
| G07C 5/08 | (2006.01) |
| H04L 12/40 | (2006.01) |
| H04L 67/12 | (2022.01) |

(52) U.S. Cl.
CPC .............. *G07C 5/008* (2013.01); *G06F 8/65* (2013.01); *G06F 9/541* (2013.01); *G07C 5/006* (2013.01); *G07C 5/0808* (2013.01); *H04L 12/40* (2013.01); *H04L 67/12* (2013.01); *H04L 2012/40215* (2013.01); *H04L 2012/40273* (2013.01)

(58) Field of Classification Search
CPC ....... G07C 5/008; G07C 5/006; G07C 5/0808
See application file for complete search history.

(56) References Cited

U.S. PATENT DOCUMENTS

| 7,363,129 B1* | 4/2008 | Barnicle ............... G08C 17/02 701/1 |
| 2003/0216889 A1* | 11/2003 | Marko .................. G07C 5/008 702/182 |
| 2004/0002799 A1* | 1/2004 | Dabbish ............. B60R 16/0231 701/32.6 |

(Continued)

FOREIGN PATENT DOCUMENTS

| WO | 01/55690 A1 | 8/2001 |
| WO | 2008/091727 A1 | 7/2008 |

OTHER PUBLICATIONS

Int. Search Report/Written Opinion cited in PCT Application No. PCT/US2017/060757 dated Feb. 27, 2018, 12 pgs.

*Primary Examiner* — Imran K Mustafa
(74) *Attorney, Agent, or Firm* — Cooper Legal Group, LLC

(57) ABSTRACT

One or more techniques and/or systems are provided for facilitating communication between a program and a vehicle computing device of a vehicle. For example, a vehicle profile may be used as an intermediary abstraction layer between the program (e.g., hosted on a mobile device, hosted on a vehicle navigation unit, etc.) and the vehicle computing device. The vehicle profile may provide data formatting functionality to enable communication and interaction because the program and the vehicle computing device may utilize different data formats, communication protocols, and/or functions. The vehicle profile may specify what information the program is allowed to access and/or what features of the vehicle are allowed to be modified by the program. The vehicle profile may determine how information can be displayed by the program through a vehicle display. Communication may be facilitated between the program, the vehicle computing device, and/or a remote device such as a cloud service.

20 Claims, 8 Drawing Sheets

(56) References Cited

U.S. PATENT DOCUMENTS

| | | | | |
|---|---|---|---|---|
| 2004/0045983 A1* | 3/2004 | McCann | ............... | B67D 1/0064 222/146.6 |
| 2006/0015254 A1* | 1/2006 | Smith | ..................... | H04W 4/02 702/3 |
| 2009/0284476 A1* | 11/2009 | Bull | ....................... | G06F 9/452 345/173 |
| 2010/0220250 A1* | 9/2010 | Vanderwall | ............ | G01C 11/02 348/837 |
| 2011/0264318 A1* | 10/2011 | Laforge | ................. | G07C 5/008 701/22 |
| 2014/0163774 A1* | 6/2014 | Demeniuk | .............. | H04L 67/12 701/2 |
| 2015/0127208 A1* | 5/2015 | Jecker | ....................... | B62D 1/00 701/23 |
| 2015/0230044 A1* | 8/2015 | Paun | ....................... | H04L 67/12 455/41.2 |
| 2016/0012795 A1* | 1/2016 | Banski | ................. | G01C 21/362 345/520 |
| 2017/0344355 A1* | 11/2017 | Sarkar | ..................... | H04W 4/50 |

* cited by examiner

PROGRAM AND VEHICLE INTERACTION

BACKGROUND

Many vehicles comprise vehicle computing devices that control various aspects of a vehicle's operation. For example, a vehicle computing device of a vehicle may monitor engine temperature, control engine operation, implement cruise control settings, etc. The vehicle computing device may communicate over a vehicle controller area network (CAN) bus with other vehicle components. The vehicle computing device and the vehicle components may communicate using proprietary communication protocols and data formats. The vehicle may also comprise a vehicle navigation unit through which a user can adjust a radio, view navigational information, etc. The vehicle navigation unit may come preprogrammed from a vehicle manufacturer, and may use the same proprietary communication protocols and data formats of the vehicle computing device and vehicle components. Unfortunately, developing programs, such as a third party program, capable of communicating with the vehicle computing device, vehicle components, and/or the vehicle navigation unit may be difficult because of the proprietary nature of such components and computing devices.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for facilitating interaction between a program (e.g., any type of software or program that can execute on computing hardware, such as a desktop application, a mobile app, a web service, wearable device software, etc.) and a vehicle are provided. In an example, program code of a program (e.g., a program hosted on a mobile device such as a smart phone, a wearable device, smart glasses, or any other computing device; a program hosted by a vehicle navigation unit within the vehicle; etc.) may be loaded into a container hosted by a vehicle operating system of a vehicle computing device. The program code may be executed within the container to generate a command (e.g., a command to turn on an interior light, a command to display a user interface populated with social network posts, a command to acquire vehicle telemetry data, etc.). In an example, a vehicle profile may be used as an intermediary abstraction layer between the program and the vehicle computing device to control execution of the program code within the container. For example, the vehicle profile may specify what telemetry data is allowed to be accessed by the program, what vehicle features (e.g., climate control) are allowed to be accessed or modified by the program, how a user interface of the program is allowed to be rendered such as through a vehicle display (e.g., a display resolution, a size of the user interface, a region of the vehicle display within which the user interface is allowed to be displayed, a color scheme, etc.), what notifications are allowed to be provided to the user (e.g., a notification that the vehicle has irregular fuel consumption), what types of general attributes and specific attributes are available (e.g., a parking brake feature, a fuel cell status, etc.), what input commands are allowed and how to interpret such (e.g., a voice command "air on" will turn a climate control fan speed on to a value of "1"), what supplementary information is to be obtained and provided (e.g., when the application wants to display point of interest information, the vehicle will also display weather information for that point of interest), etc.

The vehicle profile may be used to format the command into a format, used by a vehicle component, to create a formatted command (e.g., the vehicle component may utilize a proprietary data format, communication protocol such as used by a vehicle controller area network (CAN) bus, and/or other proprietary functions that are abstracted away from the program code by the vehicle profile). The formatted command may be executed upon the vehicle component. In an example, if the vehicle profile allows the program to access fuel consumption telemetry data, then the fuel consumption telemetry data may be acquired and provided back to the program through the vehicle profile (e.g., the vehicle profile may format the fuel consumption telemetry data into a format understood by the program, such as a vehicle operation concept "fuel consumption normal"). In another example, if the vehicle profile allows the program to turn off an interior light, then the command may be executed to turn off the interior light. In another example, the vehicle profile may format the user interface according to various display rules, and display the formatted user interface through a vehicle display (e.g., a size and position of an icon may be changed, the user interface may be resized, the user interface may be constrained to display within a region of the vehicle display, a background with a car maker logo maybe applied to the user interface, certain information may be restricted from being displayed, supplemental information may be added, etc.).

In an example, communication and interaction may be facilitated between the vehicle (e.g., the vehicle computing device, the vehicle navigation unit, etc.), the mobile device (e.g., a smart phone, a smart watch, a laptop, a wearable device, a tablet, etc.), and/or a remote device (e.g., a remote server, a cloud or other distributed computing environment, a vehicle manufacturer computing device or service, a vehicle dealership computing device or service, a vehicle maintenance facility computing device or service, etc.). Instances of the program may be hosted at the vehicle, at the mobile device, and/or at the remote device. In this way, the vehicle may send information (e.g., telemetry data) to the mobile device and/or the remote device. The mobile device may acquire data from the vehicle (e.g., telemetry data) and/or from the remote device (e.g., an update to apply to the vehicle computing device, vehicle information provided by the vehicle to the remote device for access by the mobile device regardless of where the mobile device is located in relation to the vehicle such as where a user may access vehicle information after leaving the vehicle, etc.). The mobile device may send data and/or commands to the vehicle and/or the remote device (e.g., the mobile device may process data from the vehicle to determine a vehicle performance trend that is then sent to the remote device for access by the vehicle maintenance facility). The remote device may acquire data from and/or send data to the mobile device and/or the vehicle.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
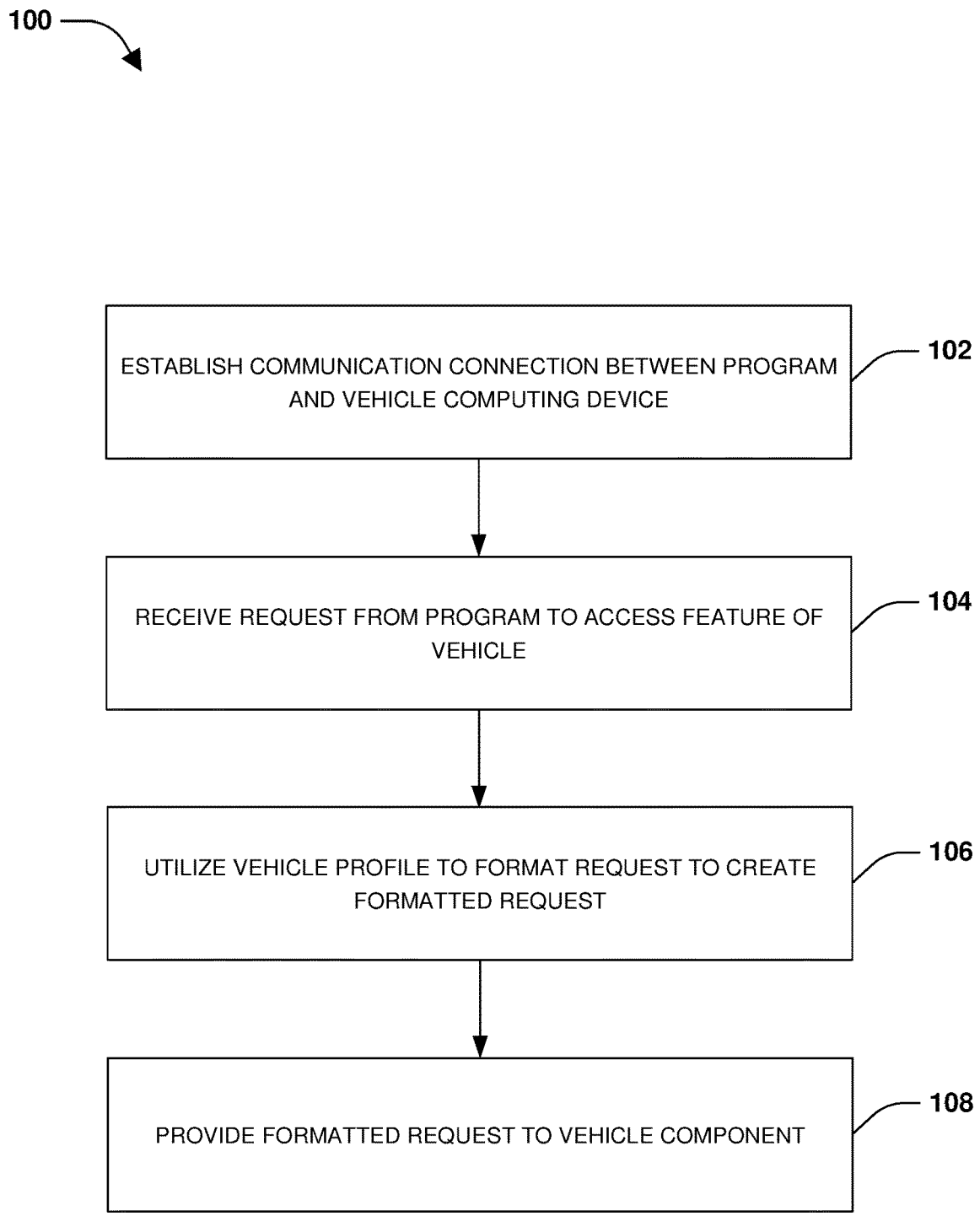
FIG. 1 is a flow diagram illustrating an exemplary method of facilitating interaction between a program and a vehicle computing device.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

One or more computing devices and/or techniques for facilitating interaction between a program and a vehicle computing device are provided. For example, an application developer may desire to develop a program (e.g., any type of software that can execute on computing hardware, such as a desktop application, a mobile app, a web service, wearable device software, etc.) that can interact with a vehicle (e.g., display a user interface through a vehicle navigation unit of the vehicle, collect and process telemetry data of the vehicle, control various functionality of the vehicle such as a radio and climate control settings, etc.). Unfortunately, development of such a program may be difficult or impossible such as for third party developers due to incompatibilities or lack of knowledge regarding proprietary software, proprietary communication functionality, proprietary data format, etc. used by the vehicle (e.g., a vehicle computing device and/or the vehicle navigation unit may communicate over a vehicle controller area network (CAN) bus using proprietary data formats and communication functionality). Thus, the application developer may spend substantial amounts of time and computing resources attempting to develop programs that are compatible with such vehicles. The application developer may have to re-write the program for each type of vehicle model, which is impractical. Further, the vehicle manufacturer may desire to not expose all information relating to how the vehicle computing device and functionality operate due to security reasons and practicality reasons.

Accordingly, as provided herein, a vehicle profile may be used as an intermediary abstraction layer between the program (e.g., a program hosted by a mobile device, a program hosted by a vehicle navigation unit, etc.) and the vehicle computing device. The vehicle profile may be used to facilitate communicate between the program and the vehicle computing device or other vehicle components (e.g., the vehicle profile may provide translation functionality to format communication between a format understood by the program and a format understood by the vehicle computing device). The vehicle profile may be used to selectively provide the program with access to acquire certain types of data from the vehicle or modify various attributes of the vehicle. The vehicle profile may restrict certain access, thus improving security (e.g., restrict the program from accessing autonomous vehicle parameters). The vehicle profile may be used to impose various display constraints upon the program, such as a color scheme, what type of information can be displayed, what region of a vehicle display such as the vehicle navigation unit can be used to display information by the program, etc.). In this way, the program may be able to interact with the vehicle through the vehicle profile.

An embodiment of facilitating interaction between a program and a vehicle computing device is illustrated by an exemplary method 100 of FIG. 1. A program may be hosted on a computing device (e.g., a mobile device such as a smart phone, a smart watch, smart glasses, a laptop, a tablet, a wearable device, etc.; a vehicle navigation unit; etc.). Because the application may not be able to directly communication and interact with the vehicle computing device of a vehicle such as due to the vehicle computing device using proprietary software, data formats, communication protocols, etc. unknown to the program, a vehicle profile may be used as an intermediary abstraction layer between the program and the vehicle computing device. At 102, a communication connection may be established, such as through the vehicle profile, between the program and the vehicle computing device. In an example where the program is hosted on a device that is not integrated into the vehicle, the communication connection may be established through Bluetooth, a universal serial bus (USB) connection, or any other wireless or wired protocol or connection between the vehicle and the device.

At 104, a request may be received from the program, over the communication connect, to access a feature of the vehicle. In an example, the request may be to acquire data from the vehicle (e.g., acquire telemetry data, oil temperature values, a left turn signal status as being on or off, etc.). In another example, the request may be to display a user interface through a vehicle display such as a vehicle navigation unit (e.g., display a social network user interface populated with social network posts, images, and/or videos of social network friends). In another example, the request may be to modify a vehicle operational parameter of the vehicle, such as to turn on a chair massage feature of the vehicle.

At 106, responsive to the vehicle profile indicating that the program has authorization to access the feature (e.g., the vehicle profile may indicate what features the program can access or is restricted from accessing), the vehicle profile may be utilized to format the request (e.g., the request may be provided by the program to the vehicle profile in a data format and through a protocol understood by the program and the vehicle profile such as through HyperText Markup Language (HTML) 5 or an online rich text editor, which the vehicle computing device may not understand) into a format, used by a vehicle component associated with the feature, to create a formatted request. For example, the formatted request, to turn on the chair massage feature, may be formatted according to a data format and/or protocol format understood by a vehicle component that controls the chair massage feature of the vehicle. At 108, the formatted request may be provided to the vehicle component.

In an example, a stream of data may be acquired from the vehicle component in response to the formatted request (e.g., the formatted request may request oil temperature values and/or vehicle speed data from the vehicle). The stream of data may be filtered based upon a set of thresholds to create filtered data (e.g., the program may only be interested in oil temperatures that exceed a threshold that may be indicative of degraded vehicle operation). Responsive to the stream of data having a change in value exceeding the threshold, the data may be included within the filtered data. Otherwise, the data may be excluded from the filtered data. In another example, the stream of data may be filtered based upon a level of data granularity metric or update rate metric to create the filtered data (e.g., the program may merely use vehicle speed values at a rate of 5 values per second, whereas the stream of data may comprise 80 values per second and thus the 80 values per second may be filtered to 5 values per second). Filtering the stream of data may provide communication bandwidth management, processing resource consumption management, and storage consumption management because data is acquired at a granularity that is not overwhelming to the program or unnecessary. In this way, the filtered data may be provided to the program.

In an example, a stream of data may be acquired from the vehicle component in response to the formatted request, such as the oil temperature values. A vehicle performance trend may be identified based upon the stream of values (e.g., increasing oil temperature indicative of a future failure of the vehicle). The program may be invoked to display diagnostic information of the vehicle based upon the vehicle performance trend.

In another example, data from the vehicle component may be acquired in response to the formatted request (e.g., vehicle speed data over time). The data may be compressed to create compressed data. The compressed data may be provided to the program, sent to a remote device such as a server, etc. In another example, data acquired from the vehicle component may be stored as a batch of data (e.g., stored within a mobile device hosting the program). The batch of data may be sent to a remote device. In this way, the efficiency of sending data of the vehicle to the remote device may be improved.

In another example, data from the vehicle component may be acquired in response to the formatted request. Responsive to the data being indicative of degraded vehicle performance (e.g., fuel consumption may much higher than expected), the program may be invoked to display a schedule maintenance user interface for scheduling a maintenance appointment for the vehicle. In this way, the drive may create a maintenance appointment to address the degraded vehicle performance.

In another example where the program is hosted on a head end unit (e.g., a vehicle navigation unit), data may be acquired from the vehicle component (e.g., braking pattern data from a braking control circuit). The data may be transmitted from the program on the head end unit to a remote device, such as a server associated with a car maker.

In an example, a data acquisition request may be received from the program to access data from the vehicle (e.g., a request to access braking pattern data). Responsive to the vehicle profile indicating that the program has authorization to access the data, the vehicle profile may be utilized to format the data acquisition request into a data access format, used by the vehicle computing device, to create a formatted data acquisition request. The formatted data acquisition request may be provided to the vehicle computing device. A response for the formatted data acquisition request may be received, such as by the vehicle profile, from the vehicle computing device. The response may be formatted into a vehicle operation concept (e.g., numerical braking value signals may be transformed into braking pattern data understood by the program). The vehicle operation concept may be provided to the program, such as by the vehicle profile.

In an example where the program is hosted on a mobile device, a connection between the mobile device and the remote device may be established. A first set of information may be sent from the mobile device to the remote device. For example, the program may send the braking pattern data to a vehicle repair center if the program determines that the braking pattern data is abnormal. The first set of information may be encrypted to create encrypted data that is sent to the remote device, which improves security. The first set of information may be compressed to create compressed data that is sent to the remote device, which reduces bandwidth utilization. A second set of information may be received from the remote device. The second set of information may have been previously provided by the vehicle computing device to the remote device. For example, a user of the mobile device may request that a distributed computing environment service (e.g., a cloud service) monitor tire pressure of the vehicle. The program may be configured to connect to the cloud service and obtain tire pressure data even though the mobile device may not be in communication range of the vehicle. The second set of information may be encrypted, and thus the program may decrypted the second set of information. In this way, information may be available and actions may be performed with regard to the vehicle even though the user may not be near the vehicle.

The user may upgrade access to the vehicle provided through the vehicle profile. For example, the user may purchase a package that now allows the user to control autonomous driving features of the vehicle. Accordingly, an upgrade request to access a second feature of the vehicle (e.g., the autonomous driving features) may be received. Responsive to the upgrade request being approved (e.g., a software distribution server may verify the upgrade request, a verification code may be validated, etc.), the vehicle profile may be modified to allow access to the second feature by the program.

Figure 2:
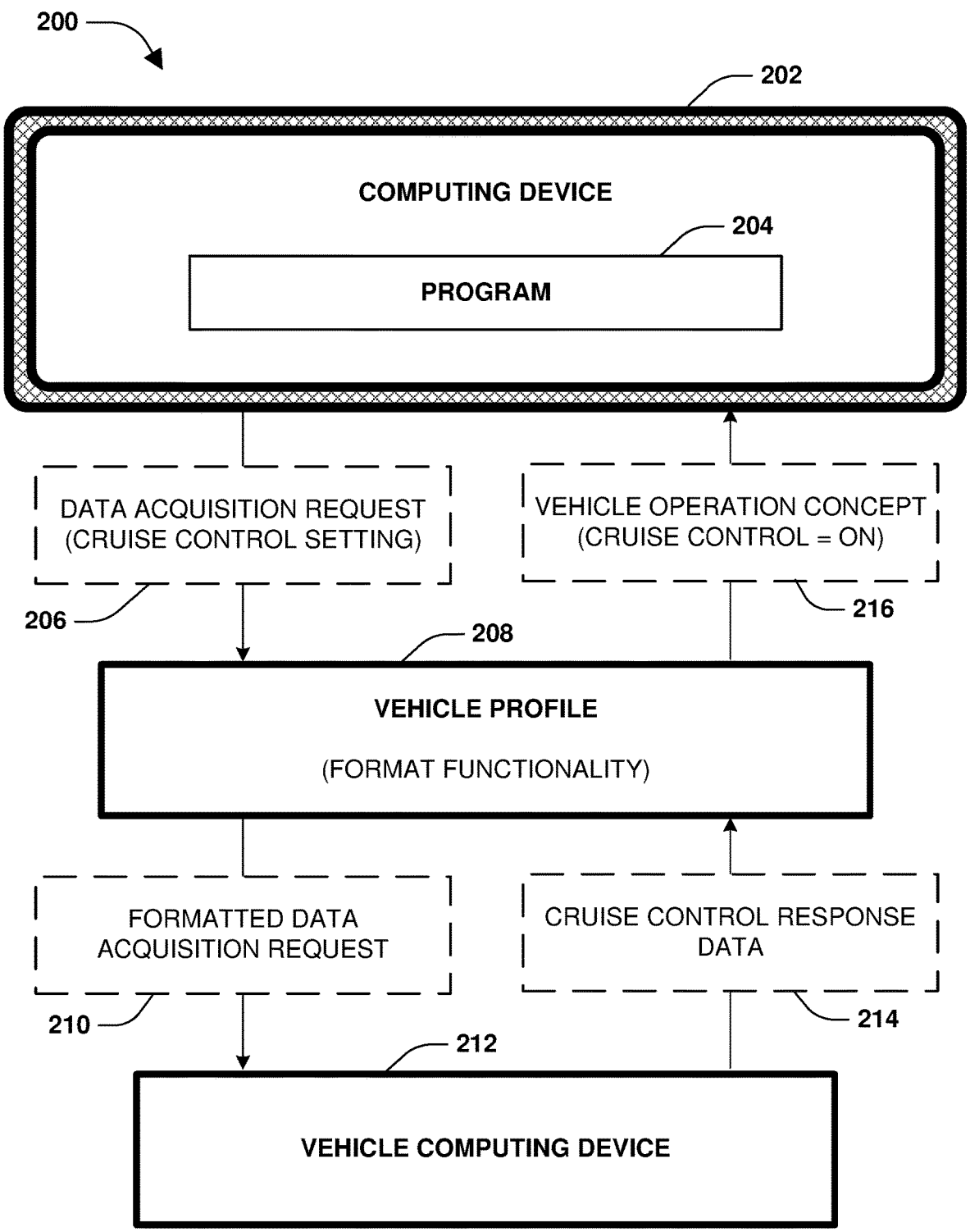
FIG. 2 is a component block diagram illustrating an exemplary system for facilitating interaction between a program and a vehicle computing device.

FIG. 2 illustrates an example of a system 200 for facilitating interaction between a program 204 and a vehicle computing device 212 of a vehicle. The program 204 may be hosted within a computing device 202, such as a head end unit (e.g., a navigation unit of the vehicle), a device not integrated into the vehicle (e.g., a tablet, a wearable device, a phone, etc.), etc. The program 204 may send a data acquisition request 206 to a vehicle profile 208. For example, the program 204 may want to obtain a cruise control setting of either "on" or "off". The vehicle profile 208 may determine that the program 204 is allowed to access cruise control data. Accordingly, the vehicle profile 208 may format the data acquisition request 206 from a format understood by the program 204 (e.g., an HTML5 format) to a format understood by the vehicle computing device 212

(e.g., a proprietary data format used by the vehicle computing device 212 to communicate over a CAN bus of the vehicle) to create a formatted data acquisition request 210.

The vehicle profile 208 sends the formatted data acquisition request 210 to the vehicle computing device 212. The vehicle computing device 212 may response with cruise control response data 214 (e.g., binary value of "1" indicative of the cruise control being "on"). Because the program 204 may not understand the binary value of "1", the vehicle profile 208 may format the cruise control response data 214 to create a vehicle operation concept understood by the program 204 (e.g., a concept that the cruise control is "on"), which is provided back to the program 204.

Figure 3:
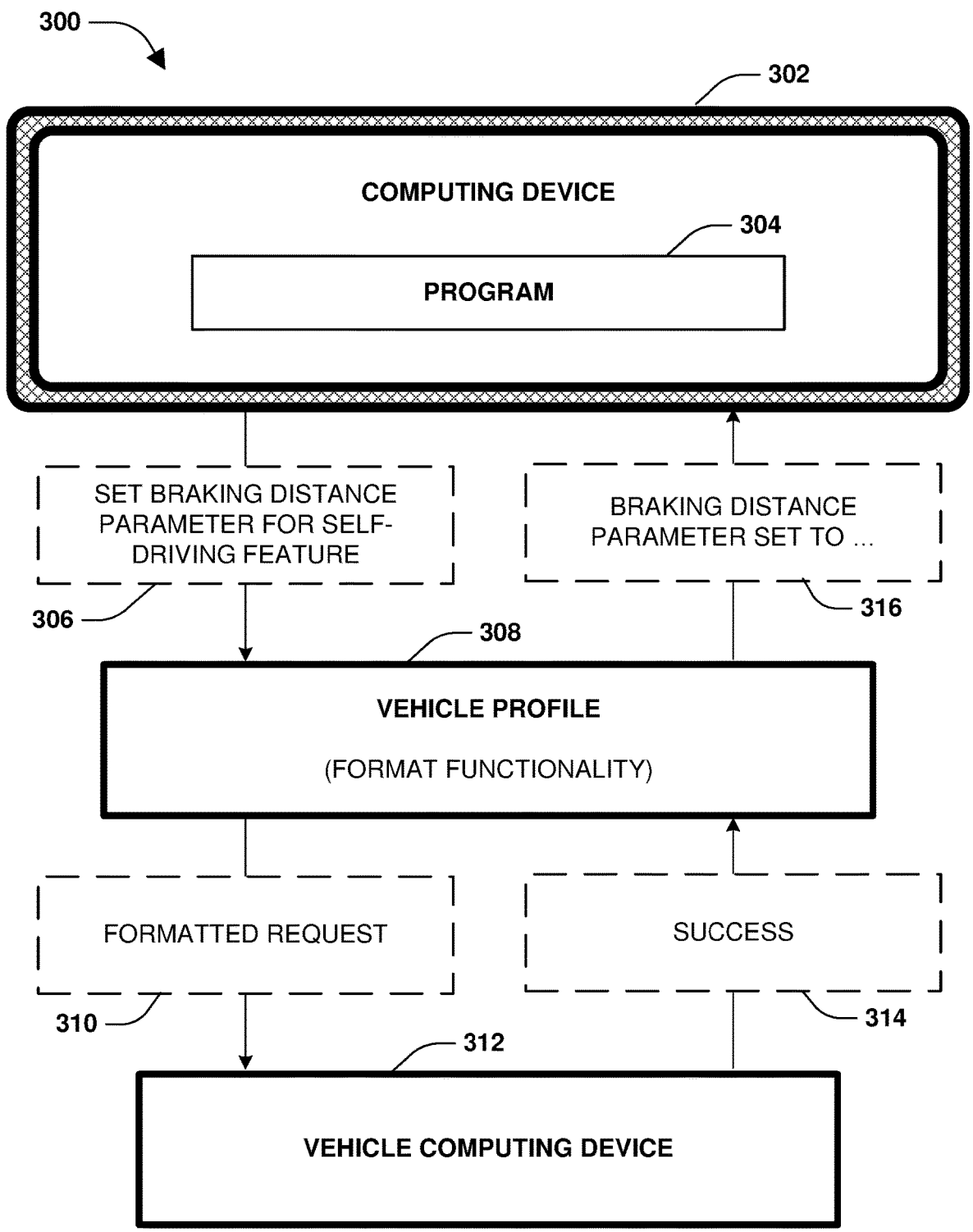
FIG. 3 is a component block diagram illustrating an exemplary system for facilitating interaction between a program and a vehicle computing device.

FIG. 3 illustrates an example of a system 300 for facilitating interaction between a program 304 and a vehicle computing device 312 of a vehicle. The program 304 may be hosted within a computing device 302, such as a head end unit (e.g., a navigation unit of the vehicle), a device not integrated into the vehicle (e.g., a tablet, a wearable device, a phone, etc.), etc. The program 304 may send a request, to set a braking distance parameter for a self-driving feature of the vehicle (e.g., a user of the program 304 may desire that autonomous driving brake sooner than normal), to the vehicle profile 308. The vehicle profile 308 may determine that the program 304 is allowed to increase braking distance to a more conservative value than a normal setting (e.g., but not decrease the braking distance below the normal setting). Accordingly, the vehicle profile 308 may format the request 306 from a format understood by the program 304 (e.g., an HTML5 format) to a format understood by the vehicle computing device 312 (e.g., a proprietary data format used by the vehicle computing device 312 to communicate over a CAN bus of the vehicle) to create a formatted request 310. If the program 304 had requested to decrease the braking distance parameter below the normal setting, then the vehicle profile 308 would deny the request.

The vehicle profile 308 sends the formatted request 310 to the vehicle computing device 312. The vehicle computing device 312 may implement the formatted request 310, and provide the vehicle profile 308 with a success message 314 that the braking distance parameter was increased. The vehicle profile 308 may send a message 316 to the program 304 that the braking distance parameter was set to the requested value.

Figure 4:
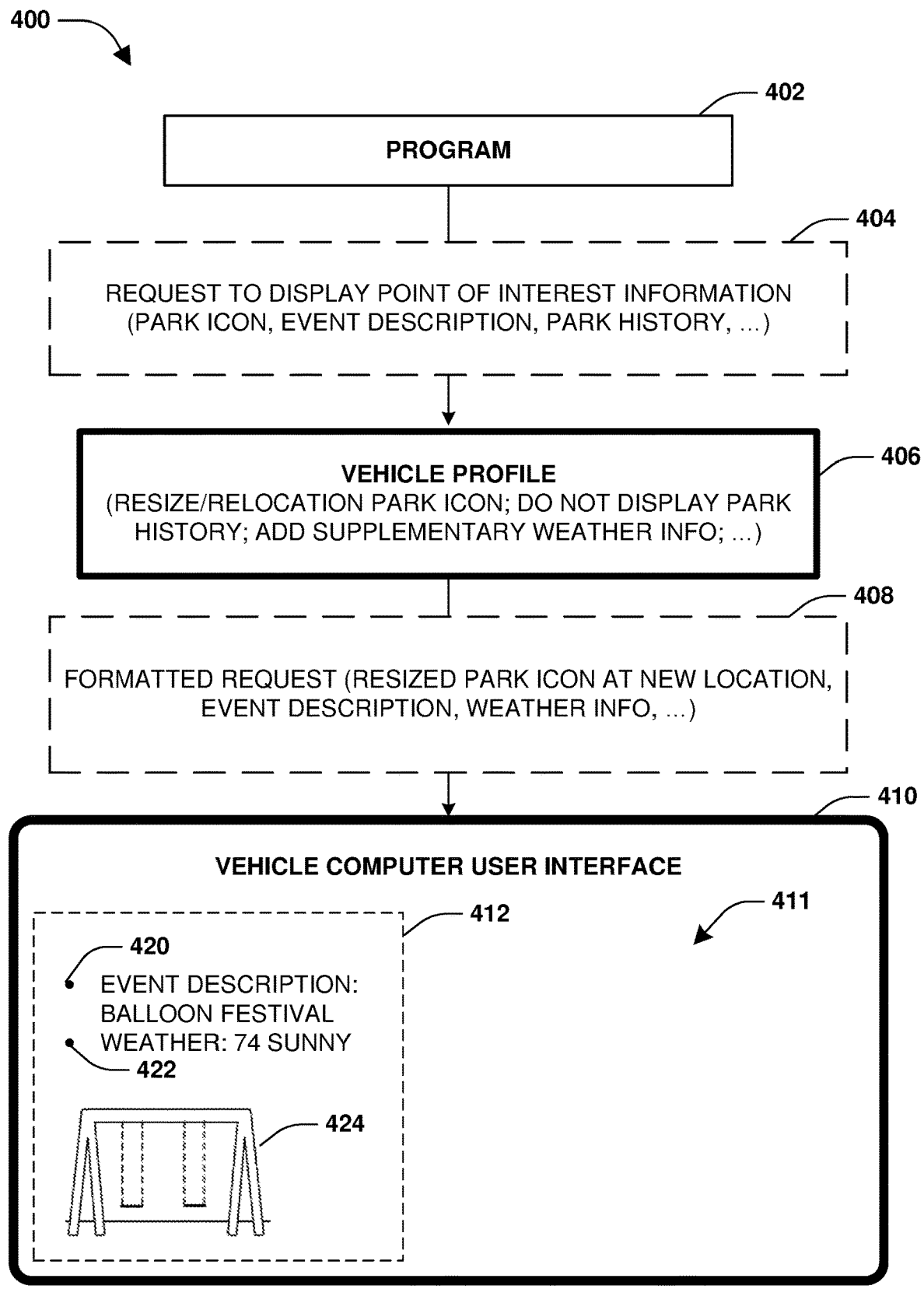
FIG. 4 is a component block diagram illustrating an exemplary system for facilitating interaction between a program and a vehicle computing device, where the program is allowed to display information through a vehicle display.

FIG. 4 illustrates a system 400 for facilitating interaction between a program 402 and a vehicle computing device of a vehicle, such as a vehicle display 410 (e.g., a display of a head end unit such as a vehicle navigation unit). The program 402 may be hosted within a computing device, such as the head end unit (e.g., the vehicle navigation unit), a device not integrated into the vehicle (e.g., a tablet, a wearable device, a phone, etc.), etc. The program 402 may send a request 404, to display point of interest information 404 through the vehicle display 410, to a vehicle profile 406. The program 402 may request 404 to display a park icon 424 of a park, an event description 420 of a balloon festival occurring at the park, and a description of a park history.

The vehicle profile 406 may determine that the program 402 has access to display information within a region 412 of a vehicle computer user interface 411 of the vehicle display 410, but not other regions of the vehicle computer user interface 411. The vehicle profile 406 may determine that the park icon 424 is to be reduced in size and relocated to a lower left portion of the region 412 instead of at a center position. The vehicle profile 406 may determine that the event description 420 is allowed to be displayed but that the park history is not allowed to be displayed (e.g., based upon a security policy, a privacy policy, a word count length criteria, a size criteria, etc.). The vehicle profile 406 may obtain supplemental weather information 422, not comprised within the request 404, for the park. In this way, the vehicle profile 406 may generate a formatted request 408 that is used to display the event description 420, the supplemental weather information 422, and the park icon 424 within the region 412.

Figure 5:
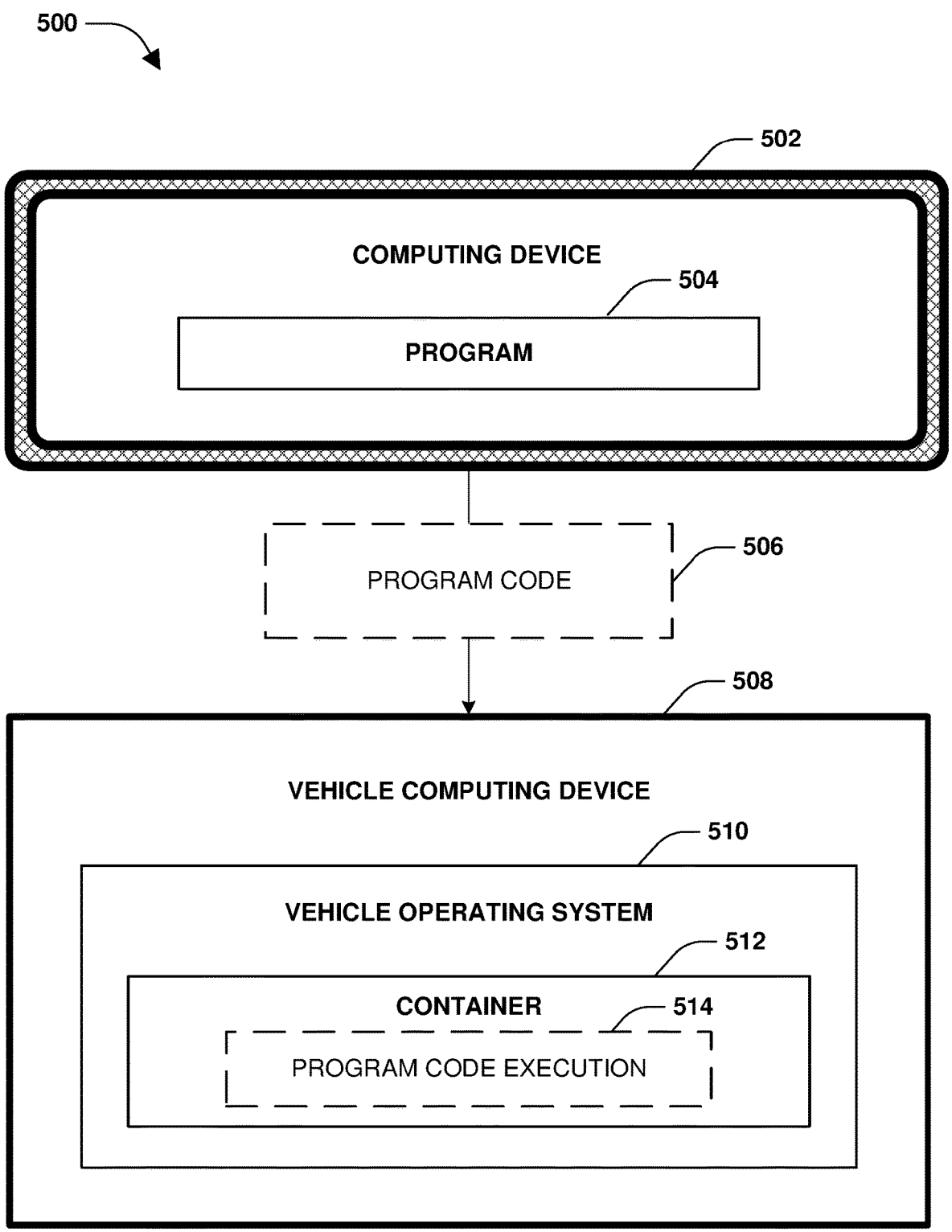
FIG. 5 is a component block diagram illustrating an exemplary system for facilitating interaction between a program and a vehicle computing device, where program code is executed within a container of a vehicle operating system.

FIG. 5 illustrates an example of a system 500 for facilitating interaction between a program 504 and a vehicle computing device 508 of a vehicle. The program 504 may be hosted within a computing device 502, such as a head end unit (e.g., a navigation unit of the vehicle), a device not integrated into the vehicle (e.g., a tablet, a wearable device, a phone, etc.), etc. Programming code 506 of the program 504 may be loaded into a container 512 hosted by a vehicle operating system 510 of the vehicle computing device 508. The programming code 506 may be executed 514 within the container 512 to generate a command (e.g., a command to acquire data from the vehicle, a command to modify a feature of the vehicle, a command to display information through a vehicle display of the vehicle, a command to send or retrieve data from a remote device such as a cloud service, etc.). The command may be formatted using a vehicle profile into a format, used by a vehicle component, to create a formatted command that is executed upon the vehicle component.

Figure 6:
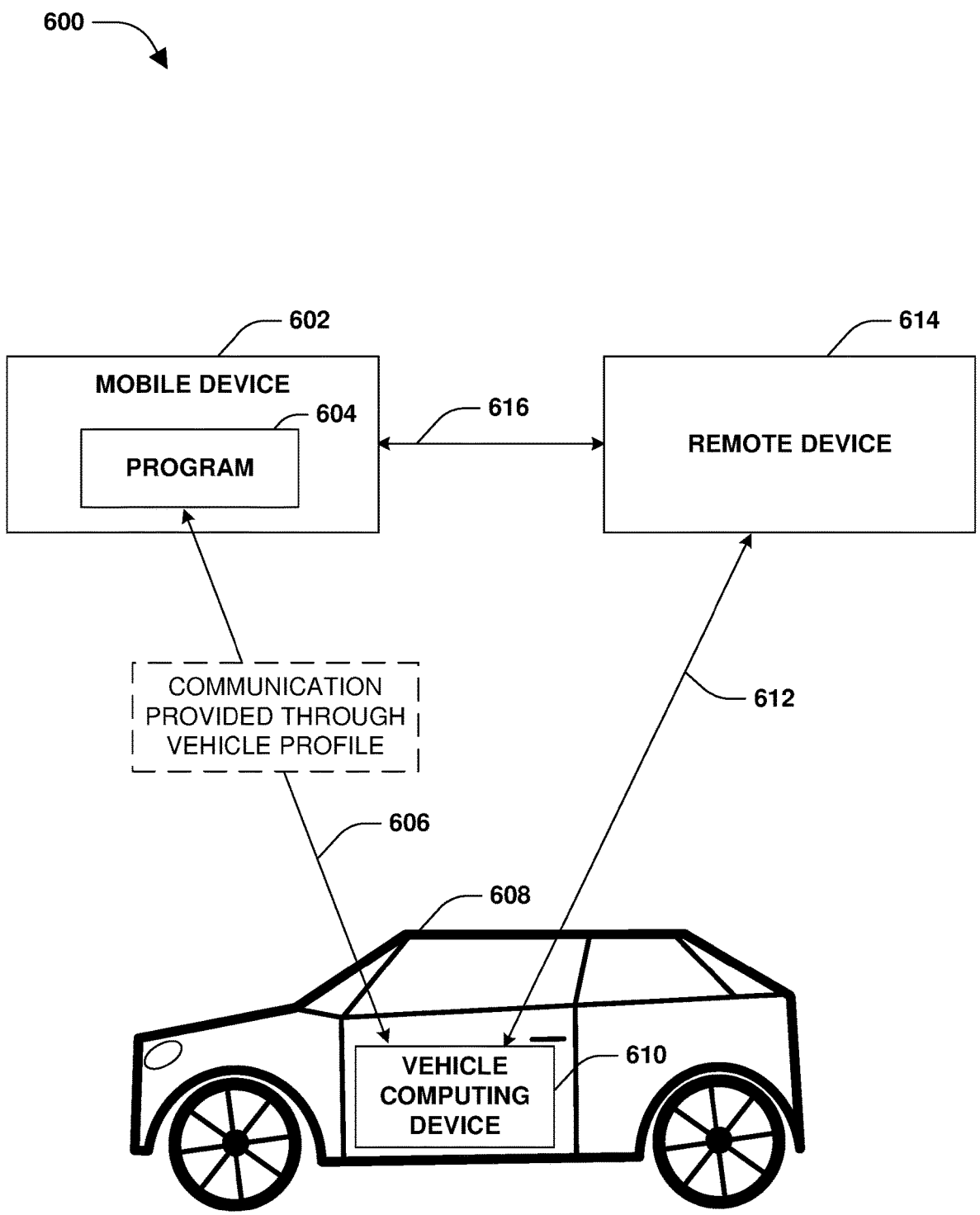
FIG. 6 is a component block diagram illustrating an exemplary system for facilitating communication between a program on a mobile device, a vehicle computing device of a vehicle, and a remote device.

FIG. 6 illustrates an example of a system 600 for facilitating interaction between a program 604 hosted on a mobile device 602, a vehicle computing device 610 integrated into a vehicle 608, and a remote device 614 (e.g., a server, a cloud service, or any other device not incorporated into the mobile device 602 and/or the vehicle computing device 610). For example, the program 604 may establish a first communication connection 606 between the mobile device 602 and the vehicle computing device 610. Data and/or commands may be communicated, through the first communication connection 606, between the program 604 and the vehicle computing device 610 using a vehicle profile as an intermediary abstraction layer. The program 604 may establish a second communication channel 616 between the mobile device 610 and the remote device 614. Data and/or commands may be communicated, through the second communication connection 616, between the program 604 and the remote device 614 (e.g., the program 604 may upload telemetry data acquired from the vehicle computing device 610; the remote device 614 may provide the program 604 with remote access to data uploaded from the vehicle computing device 610 to the remote device 614; etc.). The vehicle computing device 610 and the remote device 614 may establish a third communication connection 612 over which data and/or commands may be communicated.

In one embodiment, a method is provided for offloading processing of vehicle signal information from a vehicle computing device of a vehicle to a program hosted on a computing device. A communication connection may be established between the program of the computing device and the vehicle computing device of the vehicle. Vehicle signal information from the vehicle computing device may be received over the communication connected. The vehicle signal information may be processed to create a vehicle operational result. A command may be sent to the vehicle computing device. The command may comprise an instruction to change operation of the vehicle based upon the vehicle operational result (e.g., change a vehicle climate control temperature, change an autonomous driving parameter such as a braking distance, etc.). Because vehicles may have limited computing resources and a computing environment that may not be the best for high-precision processing (e.g., inclement weather, vibrations, etc.), the vehicle can offload vehicle signal data (e.g., a stream of data from a CAN bus) to the program for remote processing using a resource of the computing device (e.g., a mobile device).

In an example, the vehicle signal information may be compressed to create compressed that is sent to a remote computing device.

In an example, the vehicle signal information is filtered based upon a set of thresholds to create filtered data. For example, responsive to the vehicle signal information comprising data having a change in value exceeding a threshold, the data may be included within the filtered data and sent to a remote computing device.

In an example, a suggestion is generated to address a vehicle component flaw identified from the vehicle operational result, and the suggestion is sent to a remote computing device associated with a vehicle manufacturer.

In an example, a suggestion is generated about vehicle maintenance for the vehicle based upon the vehicle operational result, and the suggestion is displayed through the computing device (e.g., a driver portal).

In an example, a suggestion is generated about vehicle maintenance for the vehicle based upon the vehicle operational result, and the suggestion is sent to a remote computing device associated with a vehicle maintenance center In an example, an information request is received from the vehicle computing device. Information is acquired from a remote service based upon the information request (e.g., the vehicle may want to display information that is available from a service accessible to the program, such as news information, social network data, etc.). The information is provided from the computing device to the vehicle computing device (e.g., a parade news event story may be provided to the vehicle computing device so that navigational software may be able to provide such information to a driver about why there is congestion).

In an example, a command is constructed, by the program, to adjust an automated driving parameter used by the vehicle computing device to provide self-driving functionality for the vehicle. The command is provided to the vehicle computing device.

In an example, the computing device comprises a head unit of the vehicle. Data is acquired from a remote service, and information is provided through the head unit based upon the data (e.g., the program may provide cross-contextual information that can be shared between the vehicle, the program, and the remote service such as a cloud environment, thus allowing the program and the vehicle to share information through the remote service even though a device hosting the program is not within communication range of the vehicle).

In an example, a vehicle update is received from a remote computing device. A vehicle update command may be created based upon the vehicle update. The vehicle update command is implemented upon the vehicle computing device.

In an example, user signals, associated with a user of the computing device, are evaluated to identify a user driving preference (e.g., the user may post through a social network that the user is cold today, and thus the program may increase a climate control temperature setting of the vehicle; the user may indicate through an email that the user is sore from a run, and thus the program may turn on a chair massage function of the vehicle; the user may send a message that the user is nervous after seeing an accident, and thus the program may increase a drive behind distance used by an autonomous driving feature of the vehicle so that the vehicle stays further away from other vehicles; etc.). A vehicle operation parameter change command is generated based upon the user driving preference. The vehicle operation parameter change command is sent to the vehicle computing device for changing operation of the vehicle. In an example, social network data, message data, or calendar data of the user may be evaluated to identify the user driving preference.

In an example where the computing device comprises a mobile device, the computing device may be used as an in-vehicle infotainment device.

In one embodiment, a computing device is provided to establish a communication connection between a program of a computing device and a vehicle computing device of a vehicle. The computing device receives, over the communication connection, vehicle signal information from the vehicle computing device. The computing device sends the vehicle signal information to a remote computing device for processing. The computing device receives a command from the remote computing device. The computing device sends the command to the vehicle computing device. The command comprises an instruction to change operation of the vehicle.

In an example, the computing device instructs the vehicle computing device to modify an automated driving parameter.

In an example, the computing device receives a second command from the remote computing device (e.g., an unsolicited command), and sends the second command to the vehicle computing device.

In another example, the computing device encrypts the vehicle signal information to create encrypted data, and sends the encrypted data to the remote computing device.

In one embodiment, a communication connection is established between a program of a computing device and a vehicle computing device of a vehicle. Vehicle signal information is received over the communication connection from the vehicle computing device. The vehicle signal information is processed to create a vehicle operational result that is sent to a vehicle manufacturer.

Figure 7:
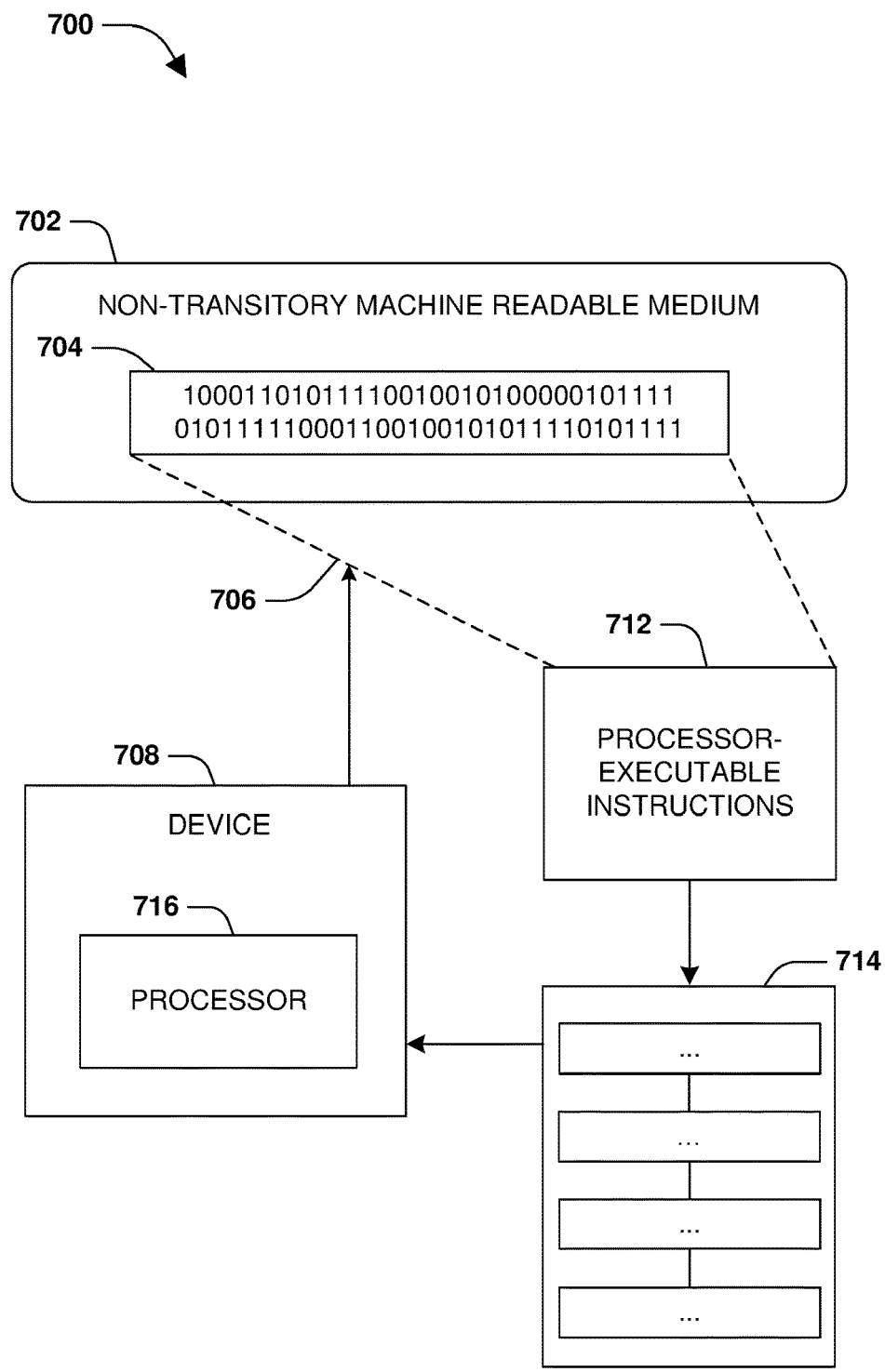
FIG. 7 is an illustration of an exemplary computing device-readable medium wherein processor-executable instructions configured to embody one or more of the provisions set forth herein may be comprised.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein. The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 702 stores computer-readable data 704 that, when subjected to reading 706 by a device 708 (e.g., a read head of a hard disk drive, or a read operation invoked on a solid-state storage device), express the processor-executable instructions 712. In some embodiments, the processor-executable instructions 712, when executed cause performance of operations, such as at least some of the example method 100 of FIG. 1, for example. In some embodiments, the processor-executable instructions 712 are configured to cause implementation of a system, such as at least some of the example system 200 of FIG. 2, at least some of the exemplary system 300 of FIG. 3, at least some of the exemplary system 400 of FIG. 4, at least some of the exemplary system 500 of FIG. 5, and/or at least some of the example system 600 of FIG. 6, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
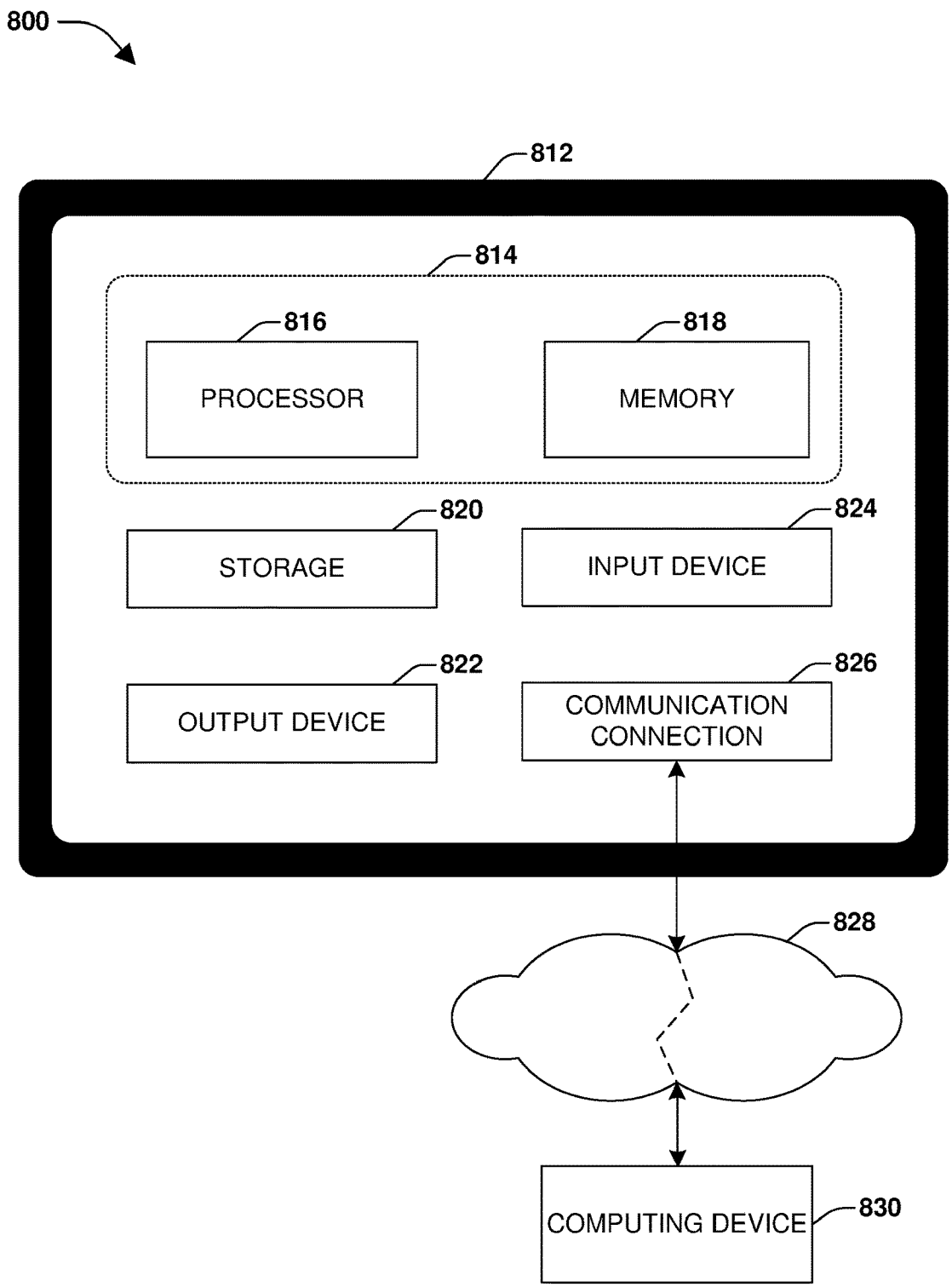
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processor 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processor 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection 826 that allows device 812 to communicate with other devices. Communication connection 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection 826 may include a wired connection or a wireless connection. Communication connection 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device 824 such as keyboard, mouse, pen, voice input device, touch input device, infrared cameras, video input devices, and/or any other input device. Output device 822 such as one or more displays, speakers, printers, and/or any other output device may also be included in device 812. Input device 824 and output device 822 may be connected to device 812 via a wired connection, wireless connection, or any combination thereof. In one embodiment, an input device or an output device from another computing device may be used as input device 824 or output device 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/ or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A non-transitory machine readable medium having stored thereon processor-executable instructions that when executed cause performance of operations, the operations comprising:
   loading program code of a program into a container hosted by a vehicle operating system of a vehicle computing device in a vehicle, wherein the program code comprises a request to render a location and information about the location within a user interface on a display of the vehicle;
   executing the program code within the container to generate a command, wherein the executing the program code comprises retrieving supplemental information about the location that was not provided by the program;
   selecting a vehicle profile from a set of vehicle profiles based upon the vehicle profile corresponding to the vehicle;
   formatting, by the program code executing on the vehicle operating system, the command using the vehicle profile into a format, used by the display, to create a formatted command, wherein the formatting comprises specifying parameters for displaying the location, the information about the location, and the supplemental information about the location within the user interface based upon a display rule identified by the program code from the vehicle profile, wherein the formatting comprises the program code executing on the vehicle operating system applying the display rule to the command to create the formatted command for execution by the vehicle computing device;
   receiving a first request by the vehicle computing device over the communication connection with a computing device separate from the vehicle;
   evaluating, using the vehicle profile, a value of a vehicle operational parameter specified by the first request against a normal setting for the vehicle operational parameter;
   in response to the value deviating from the normal setting in the vehicle profile, denying the first request; and
   in response to the value not deviating from the normal setting in the vehicle profile, modifying operation of the vehicle based upon the first request.

2. The non-transitory machine readable medium of claim 1, wherein the operations comprise:
   executing the formatted command upon the display.

3. A method of facilitating interaction between a program and a vehicle computing device of a vehicle, the method involving a computing device comprising a processor, and the method comprising:
   executing, on the processor, instructions that cause the computing device to perform operations, the operations comprising:
      establishing a communication connection between the program and the vehicle computing device;
      receiving, over the communication connection, a request to render a location and information about the location within a user interface on a display of the vehicle from the program;

retrieving supplemental information about the location that was not provided by the program;

selecting a vehicle profile from a set of vehicle profiles based upon the vehicle profile corresponding to the vehicle;

responsive to the vehicle profile for the vehicle indicating that the program has authorization to display content through the display, utilizing the vehicle profile to format the request into a format, used by the display, to create a formatted request, wherein the utilizing comprises specifying parameters for displaying the location, the information about the location, and the supplemental information about the location within the user interface based upon a display rule specified by the vehicle profile, wherein the formatting comprises applying the display rule to the request to create the formatted request for execution by the vehicle computing device;

providing the formatted request to the display;

receiving a first request by the vehicle computing device over the communication connection with a computing device separate from the vehicle;

evaluating, using the vehicle profile, a value of a vehicle operational parameter specified by the first request against a normal setting for the vehicle operational parameter;

in response to the value deviating from the normal setting in the vehicle profile, denying the first request; and in response to the value not deviating from the normal setting in the vehicle profile, modifying operation of the vehicle based upon the first request.

4. The method of claim 3, the operations comprising:
receiving a data acquisition request from the program to access data from the vehicle;
responsive to the vehicle profile for the vehicle indicating that the program has authorization to access the data, utilizing the vehicle profile to format the data acquisition request into a data access format, used by the vehicle computing device, to create a formatted data acquisition request;
providing the formatted data acquisition request to the vehicle computing device;
receiving a response from the vehicle computing device for the formatted data acquisition request;
formatting the response into a vehicle operation concept; and
providing the vehicle operation concept to the program.

5. The method of claim 3, wherein the program is hosted on a mobile device, and the operations comprising:
establishing a connection with a remote device;
sending a first set of information from the mobile device to the remote device; and
receiving a second set of information from the remote device, the second set of information previously provided by the vehicle computing device to the remote device.

6. The method of claim 3, the operations comprising:
acquiring a stream of data from a vehicle component of the vehicle in response to a second request from the program;
filtering the stream of data based upon a set of thresholds to create filtered data, the filtering comprising:
responsive to the stream of data comprising data having a change in value exceeding a threshold, including the data within the filtered data, otherwise, excluding the data; and providing the filtered data to the program.

7. The method of claim 3, the operations comprising:
acquiring a stream of data from a vehicle component of the vehicle in response to a second request from the program;
filtering the stream of data based upon a level of data granularity metric to create filtered data; and
providing the filtered data to the program.

8. The method of claim 5, the operations comprising:
encrypting the first set of information to create encrypted data; and
sending the encrypted data to the remote device.

9. The method of claim 3, the operations comprising:
acquiring a stream of data from a vehicle component of the vehicle in response to a second request from the program;
identifying a vehicle performance trend based upon the stream of data; and
invoking the program to display diagnostic information of the vehicle based upon the vehicle performance trend.

10. The method of claim 3, the operations comprising:
storing data, acquired from a vehicle component of the vehicle over time, as a batch of data; and
sending the batch of data to a remote device.

11. The method of claim 3, the operations comprising:
acquiring data from a vehicle component of the vehicle in response to a second request from the program;
compressing the data to create compressed data; and
providing the compressed data to the program.

12. The method of claim 3, the operations comprising:
receiving, over the communication connection, a second request from the program to access a feature of the vehicle;
utilizing the vehicle profile to format the first request into a format, used a vehicle component associated with the feature, to create a second formatted request; and
providing the second formatted request to the vehicle component, wherein the providing the second formatted request comprises:
invoking the vehicle component to modify a vehicle operational parameter of the vehicle based upon the second formatted request.

13. The method of claim 12, wherein the vehicle operational parameter comprises an automated driving parameter.

14. The method of claim 3, the operations comprising:
acquiring data from a vehicle component of the vehicle in response to a second request from the program; and
responsive to the data being indicative of degraded vehicle performance, invoking the program to display a schedule maintenance user interface for scheduling a maintenance appointment for the vehicle.

15. The method of claim 3, wherein the program is hosted on a head end unit of the vehicle, and the operations comprising:
receiving, over the communication connection, a second request from the program to access a feature of the vehicle;
utilizing the vehicle profile to format the request into a format, used a vehicle component associated with the feature, to create a second formatted request; and
providing the second formatted request to the vehicle component,
acquiring data from the vehicle component; and
transmitting the data to a remote device.

16. The method of claim 3, the operations comprising:
receiving an upgrade request to access a second feature of the vehicle; and responsive to approving the upgrade request, modifying the vehicle profile to allow access to the second feature by the program.

17. The method of claim 3, the operations comprising:
modifying the vehicle profile based upon an upgrade request to access a second feature of the vehicle that the program was previously restricted from accessing.

18. The method of claim 3, wherein:
the information about the location comprises information about an event at the location, and
the retrieving supplemental information comprises retrieving a predicted temperature at the location at a time of the event.

19. A non-transitory machine readable medium having stored thereon processor-executable instructions that when executed cause performance of operations, the operations comprising:
establishing a communication connection between a program and a vehicle computing device of a vehicle;
receiving, over the communication connection, a request to render a location and information about the location within a user interface on a display of the vehicle from the program;
retrieving supplemental information about the location that was not provided by the program;
selecting a vehicle profile from a set of vehicle profiles based upon the vehicle profile corresponding to the vehicle;
responsive to the vehicle profile for the vehicle indicating that the program has authorization to display content through the display, utilizing the vehicle profile to format the request into a format, used the display, to create a formatted request, wherein the utilizing comprises specifying parameters for displaying the location, the information about the location, and the supplemental information about the location within the user interface based upon a display rule specified by the vehicle profile, wherein the formatting comprises applying the display rule to the request to create the formatted request for execution by the vehicle computing device;
providing the formatted request to the display;
receiving a first request by the vehicle computing device over the communication connection with a computing device separate from the vehicle;
evaluating, using the vehicle profile, a value of a vehicle operational parameter specified by the first request against a normal setting for the vehicle operational parameter;
in response to the value deviating from the normal setting in the vehicle profile, denying the first request; and
in response to the value not deviating from the normal setting in the vehicle profile, modifying operation of the vehicle based upon the first request.

20. The non-transitory machine readable medium of claim 19, wherein:
the information about the location comprises information about an event at the location, and
the retrieving supplemental information comprises retrieving a predicted temperature at the location at a time of the event.

* * * * *